United States Patent
Thomassin (10) Patent No.: US 10,196,923 B2
(45) Date of Patent: Feb. 5, 2019

(54) OPERATION OF AIRCRAFT ENGINES DURING TRANSIENT CONDITIONS

(71) Applicant: Pratt & Whitney Canada Corp., Longueuil (CA)

(72) Inventor: Jean Thomassin, Ste-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 836 days.

(21) Appl. No.: 14/471,130

(22) Filed: Aug. 28, 2014

(65) Prior Publication Data

US 2016/0061053 A1    Mar. 3, 2016

(51) Int. Cl.
| | |
|---|---|
| F01D 17/06 | (2006.01) |
| F02C 3/10 | (2006.01) |
| F02C 6/14 | (2006.01) |
| F02C 7/32 | (2006.01) |

(52) U.S. Cl.
CPC ............... *F01D 17/06* (2013.01); *F02C 3/10* (2013.01); *F02C 6/14* (2013.01); *F02C 7/32* (2013.01); *F05D 2220/50* (2013.01)

(58) Field of Classification Search
CPC .......... F01D 17/04; F01D 17/06; F01D 17/08; F01D 17/085; F01D 17/20; F01D 15/10; F01D 19/00; F01D 21/00; F01D 21/02; F01D 21/14; F02C 3/10; F02C 6/14; F02C 7/32; F05D 2220/3212; F05D 2220/50; F05D 2260/85; F05D 2260/90; F05D 2270/02; F05D 2270/023; F05D 2270/05; F05D 2270/051; F05D 2270/053; F05D 2270/061; F05D 2270/304
See application file for complete search history.

(56) References Cited

U.S. PATENT DOCUMENTS

| | | | |
|---|---|---|---|
| 5,694,765 A | 12/1997 | Hield et al. | |
| 6,442,945 B1 * | 9/2002 | Rakhmailov | F02C 3/067 60/39.41 |

(Continued)

FOREIGN PATENT DOCUMENTS

| | | |
|---|---|---|
| EP | 2685068 A2 | 1/2014 |
| EP | 2733312 A2 | 5/2014 |

OTHER PUBLICATIONS

Canadian Intellectual Property Office; Office Action dated May 10, 2016 re: Canadian Patent Application No. 2,898,985.

(Continued)

*Primary Examiner* — Richard A Edgar
*Assistant Examiner* — Alexander White
(74) *Attorney, Agent, or Firm* — Norton Rose Fulbright Canada LLP (57) ABSTRACT

Aircraft engines and methods for operating such aircraft engines during transient conditions are described. An exemplary method comprises identifying a transient condition of the aircraft engine and at least partially absorbing the transient condition using an electrical system of the aircraft. When the transient condition requires acceleration of the engine, absorbing the transient condition may comprise transferring power from the electrical system to the high-pressure spool of the engine. When the transient condition requires deceleration of the engine, absorbing the transient condition may comprise transferring power from the high-pressure spool to the electrical system.

17 Claims, 4 Drawing Sheets

(56) References Cited

U.S. PATENT DOCUMENTS

| | | | |
|---|---|---|---|
| 7,188,475 B2 * | 3/2007 | McGinley | F02C 7/275 |
| | | | 60/726 |
| 7,285,871 B2 | 10/2007 | Derouineau | |
| 7,327,047 B2 | 2/2008 | Tsuzuki | |
| 7,513,120 B2 | 4/2009 | Kupratis | |
| 7,775,044 B2 | 8/2010 | Julien et al. | |
| 7,777,358 B2 | 8/2010 | Halsey et al. | |
| 7,926,287 B2 * | 4/2011 | Ullyott | F01D 21/06 |
| | | | 60/773 |
| 8,181,442 B2 * | 5/2012 | Youssef | F02C 3/113 |
| | | | 60/226.1 |
| 8,543,262 B1 | 9/2013 | Gehrke et al. | |
| 8,552,575 B2 | 10/2013 | Teets et al. | |
| 9,764,732 B2 | 9/2017 | Kim et al. | |
| 2006/0150633 A1 | 7/2006 | McGinley | |
| 2013/0025567 A1 | 1/2013 | Thomassin et al. | |
| 2013/0098060 A1 | 4/2013 | Suciu et al. | |
| 2014/0020380 A1 | 1/2014 | Thomassin | |
| 2017/0225573 A1 | 8/2017 | Waltner | |
| 2017/0260872 A1 | 9/2017 | Munevar | |

OTHER PUBLICATIONS

Dooley et al., Engine Starting System Using Stored Energy, U.S. Appl. No. 13/803,572, filed Mar. 14, 2013.
Extended European search report re: European Patent Application No. 15182515.5-1607.
Canadian Intellectual Property Office; Office Action dated Apr. 10, 2017 re: Canadian Patent Application No. 2,898,985.

* cited by examiner

OPERATION OF AIRCRAFT ENGINES DURING TRANSIENT CONDITIONS

TECHNICAL FIELD

The disclosure relates generally to aircraft engines, and more particularly to the operation of aircraft engines during transient conditions during which changes from one operational condition to another take place.

BACKGROUND OF THE ART

Engines that are used in aircraft applications are typically subjected to transient operating conditions where they are accelerated and decelerated during a flight cycle. Aircraft engines are typically designed for high efficiency during some phase(s) of flight (e.g. cruise) and may, in some configurations, present operability challenges during transient operating conditions.

Improvement is therefore desirable.

SUMMARY

In one aspect, the disclosure describes a method for operating an aircraft engine during a transient condition of the aircraft engine. The aircraft engine includes a turbine having at least a high-pressure turbine spool and a low-pressure turbine spool. The method comprises:

identifying a transient condition of the aircraft engine during operation of the aircraft engine requiring one of an increase or decrease in rotational speed of the high-pressure spool;

conditioned upon the transient condition requiring an increase in rotational speed of the high-pressure spool, providing power from a source of power separate from the aircraft engine to the high-pressure spool to at least partially accelerate the high-pressure spool during the transient condition, the source of power comprising an electrical system of an aircraft; and conditioned upon the transient condition requiring a decrease in rotational speed of the high-pressure spool, drawing power from the high-pressure spool to the electrical system to at least partially decelerate the high-pressure spool during the transient condition.

In another aspect, the disclosure describes an aircraft engine comprising:

a high-pressure spool;

a low-pressure spool configured for rotation separate from the high-pressure spool;

a controller configured to, during operation of the aircraft engine, identify a transient condition of the aircraft engine and command:

conditioned upon the transient condition requiring an increase in rotational speed of the high-pressure spool, injection of power into the aircraft engine by transferring power from a source of power separate from the aircraft engine to the high-pressure spool to at least assist in achieving the required increase in rotational speed of the high-pressure spool during the transient condition, the source of power comprising an electrical system of an aircraft; and conditioned upon the transient condition requiring a decrease in rotational speed of the high-pressure spool, drawing of power from the aircraft engine by transferring power from the high-pressure spool to the electrical system to at least assist in achieving the required decrease in rotational speed of the high-pressure spool during the transient condition.

In a further aspect, the disclosure describes a method for operating an aircraft engine during a transient condition of the aircraft engine where the aircraft engine comprises a gas turbine having a high-pressure spool and a low-pressure spool. The method comprises:

identifying a transient condition of the aircraft engine during operation of the aircraft engine; and at least partially absorbing the transient condition of the aircraft engine using an electrical system of an aircraft by one of:

injecting power into the aircraft engine by transferring power from the electrical system to the high-pressure spool; and drawing power from the aircraft engine by transferring power from the high-pressure spool to the electrical system.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to methods, systems and components useful in the operation of aircraft engines during transient conditions. Exemplary transient conditions as referenced herein may include a change from one operational condition to another such as starting, acceleration and deceleration of an aircraft engine. For example, a transient condition may include a desired increase or decrease in output power from the aircraft engine. In various embodiments, aspects of the present disclosure may be useful for transient conditions that occur during operation (i.e., during flight or taxiing, other than starting) of an aircraft engine that may require the acceleration or deceleration of at least one spool of the aircraft engine.

Even though the present disclosure makes reference to an exemplary turbofan gas turbine engine, various aspects of the present disclosure may be useful for other types of engines including gas turbine engines of the turbo-shaft and turbo-prop types. In various embodiments, the methods, systems and components disclosed herein may be useful in the operation of engines for different types of aircraft including fixed-wing and rotary-wing aircraft such as helicopters. In some embodiments, methods, systems and components disclosed herein may be useful in handling operational transients of aircraft engines (e.g., gas turbine engines) having a plurality of spools such as one or more high-pressure spools and one or more low-pressure spools that are configured to rotate separately from each other (i.e., that are not rigidly coupled to each other).

Aspects of various embodiments are described through reference to the drawings.

Figure 1:
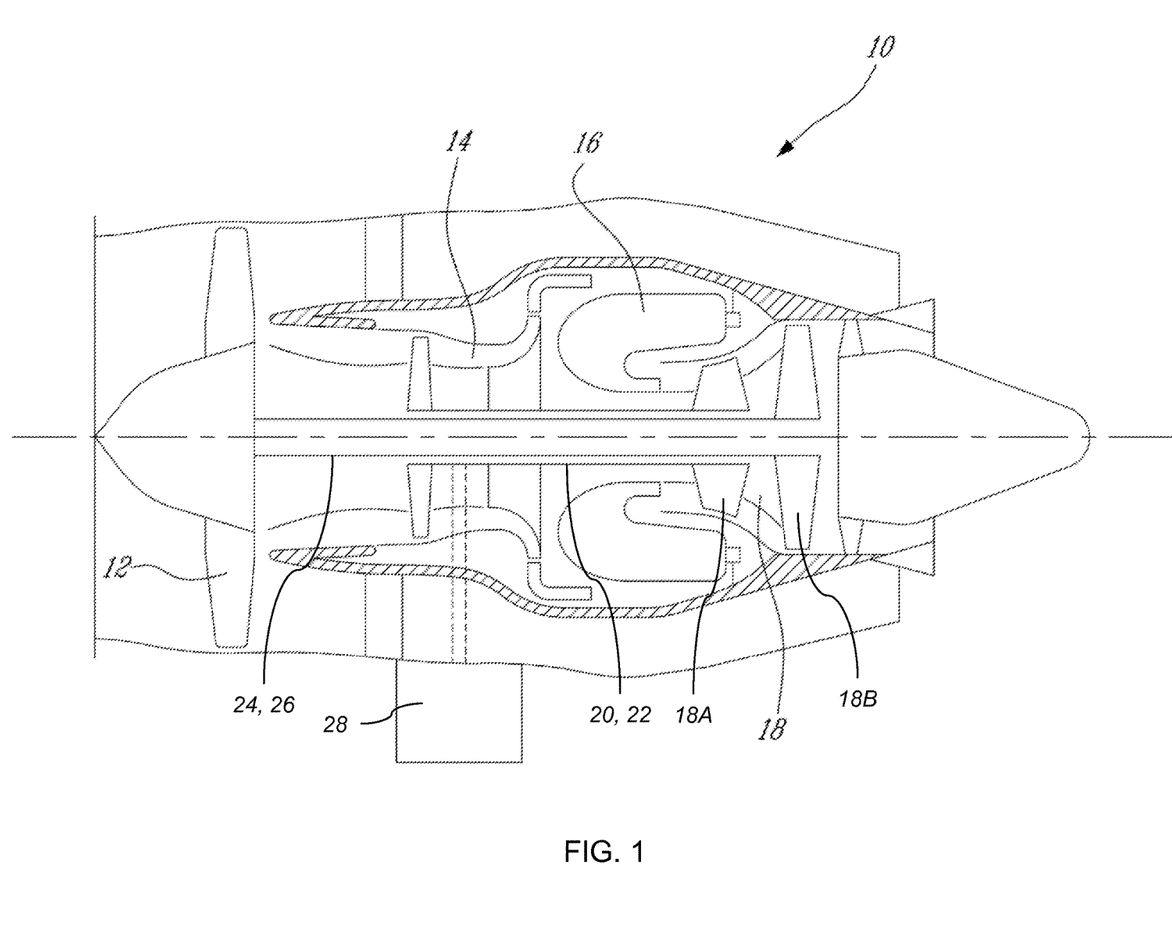
FIG. 1 shows an axial cross-section view of an exemplary aircraft engine.

FIG. 1 illustrates a gas turbine engine 10 of a type preferably provided for use on an aircraft in subsonic flight. Aircraft engine 10 may generally comprise, in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases. Aircraft engine 10 may comprise high-pressure spool 20 (referred hereinafter as "HP spool 20") comprising one or more stages of compressor 14, and one or more stages of turbine section 18. For example, HP spool 20 may comprise high-pressure turbine 18A and one or more stages of compressor 14 coupled together for common rotation via high-pressure shaft 22 (referred hereinafter as "HP shaft 22"). Aircraft engine 10 may also comprise low-pressure spool 24 (referred hereinafter as "LP spool 24") comprising fan 12 (or some other load) and low-pressure turbine 18B coupled together for common rotation via low-pressure shaft 26 (referred hereinafter as "LP shaft 26").

HP shaft 22 and LP shaft 26 may be mounted coaxially relative to each other. For example, LP shaft 26 may extend through HP shaft 22, which may have a hollow construction. HP spool 20 and LP spool 24 may be configured to rotate separately from each other at different rotational speeds. For example HP spool 20 and LP spool 24 may not be mechanically (i.e., rigidly) coupled together so that rotation of HP spool 20 and LP spool 24 may be considered to be at least to some extent independent of each other. For example, in some embodiments, HP spool 20 and LP spool 24 may be configured to rotate in opposite directions.

Aircraft engine 10 may also comprise accessory gear box 28 (referred hereinafter as "AGB 28") which may be coupled to HP spool 20 and configured to be further coupled to one or more accessories (described further below and shown in FIG. 2). Accordingly, AGB 28 may provide means for power to be transferred to or from HP spool 20.

Figure 2:
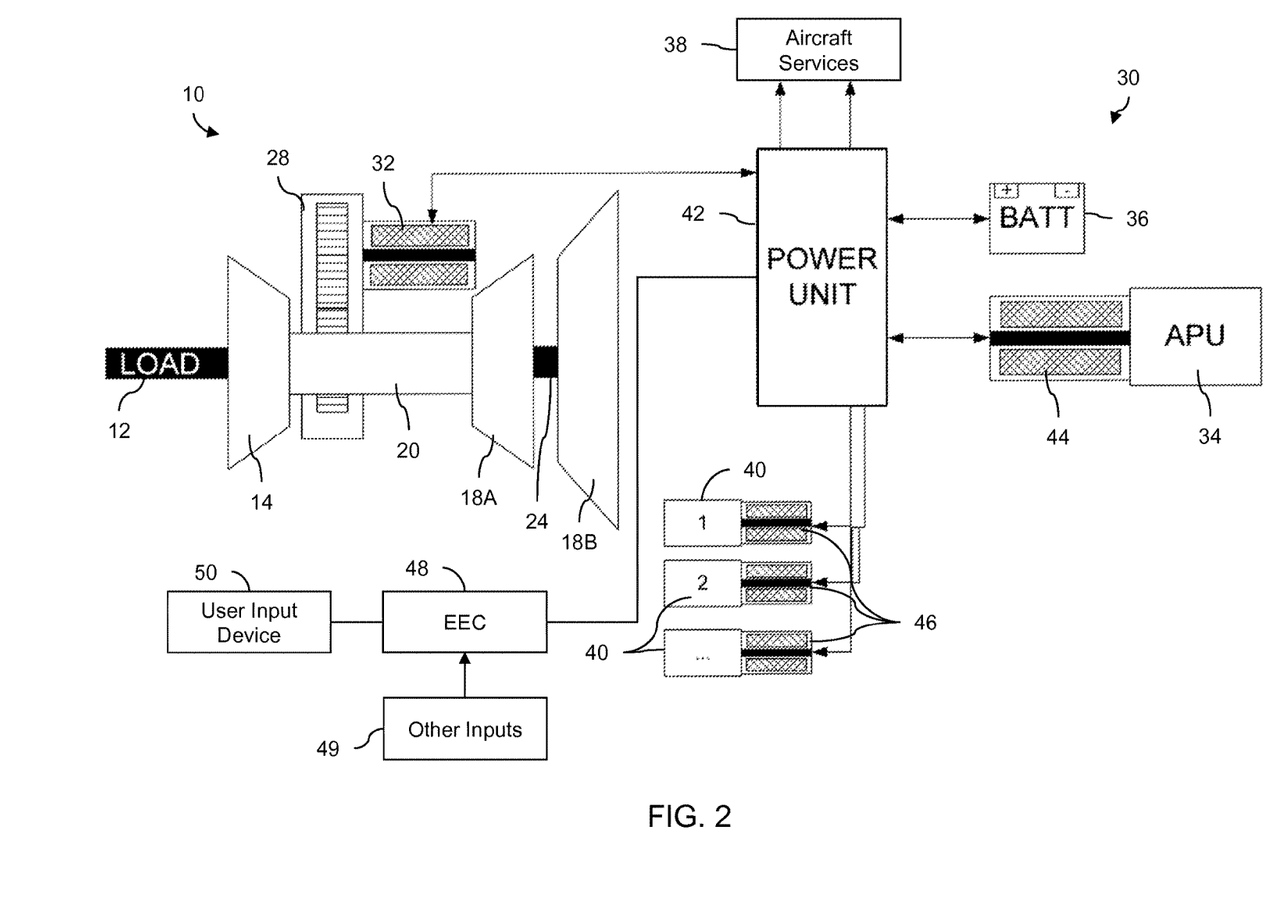
FIG. 2 is a schematic representation of the engine of FIG. 1 coupled to an electrical system of an aircraft.

FIG. 2 is a schematic representation of aircraft engine 10 coupled to electrical system 30 of an aircraft (not shown). Coupling between aircraft engine 10 and electrical system 30 may be achieved via electric machine 32 and AGB 28. Electric machine 32 may be configured to be selectively operated as a generator or as a motor depending on whether power is injected into engine 10 or power is drawn from engine 10. As explained below, electrical system 30 or part(s) thereof may serve as a power source separate from engine 10 and which may be used to inject power into engine 10 via electric machine 32. Electrical system 30 or part(s) thereof may instead or in addition serve as a power load separate from engine 10 and which may be used to draw power from engine 10 via electric machine 32. In some embodiments, electric machine 32 may be coupled directly to HP spool 20 without the use of AGB 28. For example, electric machine 32 may be configured to be mounted concentrically to HP spool 20 where a rotor of electric machine 32 may be coupled for rotation with HP spool 20 and a stator of electric machine 32 may be coupled to another structure of engine 10 that is stationary relative to HP spool 20.

Electrical system 30 may comprise one or more auxiliary power units 34 (referred hereinafter as "APU 34"), one or more batteries 36 (referred hereinafter as "battery 36"), one or more aircraft-related services 38 (i.e., electrical loads) and one or more accessories 40 (i.e., electrical loads) which may be associated with aircraft engine 10 or some other system(s) of the aircraft, and, power unit 42. Power unit 42 may comprise a plurality of power switching/control elements and may be used for controlling the transfer of electrical power between various components connected thereto. Power unit 42 may also comprise power conditioning equipment to accommodate the different power requirements of the multiple sources and loads that may be connected together via power unit 42.

APU 34 may comprise a source of mechanical power separate from, and that may be operated independently of, aircraft engine 10 but that may be onboard the same aircraft as aircraft engine 10. For example, APU 34 may comprise one or more combustion engines such as a gas turbine engine, diesel generator or a heavy fuel rotary-type engine as referenced in U.S. patent application Ser. No. 13/273,534. In some embodiments, APU may comprise a rotary engine as referenced in U.S. Pat. No. 7,775,044 and U.S. patent application Ser. No. 13/554,517, which are incorporated herein by reference. APU 34 may be coupled to power unit 42 via electric machine 44. Electric machine 44 may be configured to operate as a generator or as a motor. For example, electric machine 44 may be operated as a generator to convert mechanical power from APU 34 into electrical power. Alternatively, electric machine 44 may be operated as a motor for transmitting mechanical power to APU 34 during starting of APU 34 for example.

Battery 36 may comprise one or more electrochemical cells in which chemical energy may be stored and converted into electrical energy when required. In various embodiments, battery 36 may be rechargeable by directing electrical current into battery 36.

Aircraft-related services 38 may comprise any electrical load(s) that may be associated with system(s) of the aircraft.

Accessories 40 may include one or more devices/systems that may, in existing engines, be driven by mechanical coupling to AGB 28 via respective mounting pads to AGB 28. However, in various embodiments of the present disclosure, such accessories 40 may instead be electrically coupled to AGB 28 via electric machine 32 and respective electric machines 46. In some embodiments, one or more of electric machines 46 may be configured to be operated as motors or generators. Accordingly, since accessories 40 may be electrically coupled to HP spool 20 via electric machine 32, separate mounting pads for mechanically coupling individual accessories 40 to AGB 28 may not be required. Accordingly, electric machine 32 may have a relatively larger capacity than conventional electric starters and such larger capacity may be beneficial during cold starts of aircraft engine 10 and also at high altitude relights. As explained below, electric machine 32 may be used to at least partially absorb transient conditions during operation of aircraft engine 10 but may also (or instead) be used during starting of engine 10.

Power unit 42 may be connected to one or more digital computer(s) or other data processors, sometimes referred to as electronic engine controller(s) 48 (referred hereinafter as "EEC 48") and related accessories that control at least some aspects of performance of engine 10. For the purpose of the present disclosure, EEC 48 may be considered part of engine 10. EEC 48 may be part of a Full Authority Digital Engine Control sometimes also referred to as "FADEC". EEC 48 may be configured to make decisions regarding the operation of engine 10 until a pilot wishes to or is required to intervene. EEC 48 may include one or more data processors, microcontrollers or other suitably programmed or programmable logic circuits. EEC 48 may also comprise memory(ies) and memory data devices or register(s). Such memory(ies) may comprise any (e.g., non-transitory) computer-readable storage means (e.g. devices) suitable for retrievably storing machine-readable instructions executable by one or more processors of EEC 48. Such machine-readable instructions may cause EEC 48 to conduct operations associated with various methods disclosed herein or part(s) thereof. For example, such machine-readable instructions may cause EEC 48 to generate output(s) that may serve to command actions associated with the methods disclosed herein. Such machine-readable instructions may be embodied as a computer program product having computer readable program code executable by one or more processors of EEC 48.

EEC 48 may receive various inputs 49 related to environmental parameters, operational parameters of engine 10 and/or the performance of engine 10 and use such inputs to control at least some aspects (e.g., fuel flow) of engine 10. One or more of such inputs 49 may be sensed. EEC 48 may also receive inputs 49 from other systems of the aircraft. EEC 48 may also receive user inputs from a pilot (e.g., captain or first officer) of the aircraft for example via user input device 50. User input device 50 may comprise any suitable means or device provided to a pilot in the cockpit of the aircraft to provide input to EEC 48 or other aircraft system. For example, a pilot of the aircraft may instruct EEC 48 via user input device 50 to carry out a change from one operational condition of engine 10 to another. Such transient condition could require an acceleration or a deceleration of engine 10 in order to respectively increase or decrease the power (e.g., thrust) output from engine 10. In some embodiments, such transient condition could require an acceleration or a deceleration of HP spool 20 of engine 10. In some embodiments, user input device 50 may include a throttle lever, sometimes also referred to as a "thrust lever" or a "power lever" that permits the pilot to control the output power of aircraft engine 10.

Some modern multi-stage gas turbine engines are designed for high efficiency and may present operability challenges in some configurations where the inertia of HP spool 20 is high relative to the power output of such engines. As explained below, electrical system 30 of the aircraft may assist engine 10 during such transient condition requiring an acceleration or a deceleration of HP spool 20 by at least partially absorbing the transient condition. In various aspects of the present disclosure, while the average power output of engine 10 may be provided without the transfer of power from electrical system 30, the transient condition(s) may be at least partially absorbed by electrical system 30. Accordingly, in some embodiments, engine 10 may be considered a hybrid aircraft power plant where part of the transient condition may be managed (e.g., absorbed) by electrical system 30.

Figure 3:
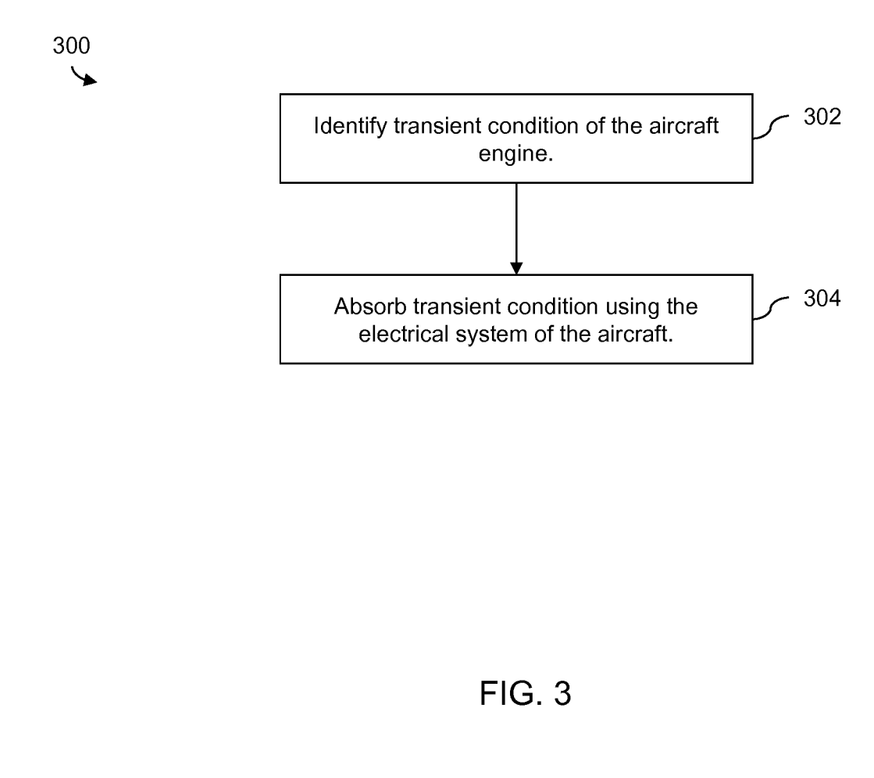
FIG. 3 is a flowchart illustrating an exemplary method for operating an aircraft engine during a transient condition.

FIG. 3 is a flowchart illustrating an exemplary method 300 for operating aircraft engine 10 during a transient condition. As described above, aircraft engine 10 may comprising a gas turbine having HP spool 20 and LP spool 24 and the transient condition may, in some embodiments, be identified during operation of engine 10 and accordingly may comprise a condition other than the starting of engine 10. For example, the transient condition may include a change in power output from engine 10 during flight or taxiing of the aircraft to which engine 10 is mounted. Method 300 may comprise: identifying a transient condition of aircraft engine 10 (see block 302); and absorbing the transient condition using electrical system 30 of the aircraft (see block 304). The transient condition may be identified by or via EEC 48. For example, the transient condition may be identified based on one or more inputs received at EEC 48.

In some embodiments, the transient condition may be user-initiated and be identified based on the actuation of user input device 50. For example, a pilot of the aircraft may actuate a throttle lever to request an increase or decrease in output power from engine 10 and such transient condition may require either an increase or a decrease in the rotational speed of HP spool 20 of engine 10. Accordingly, the identification of the transient condition may comprise the detection an actuation of a user input device (e.g., movement of a throttle lever) associated with aircraft engine 10. Alternatively, the identification of the transient condition may be made based on fuel flow to engine 10 and/or other dynamic parameter available to EEC 48.

In some embodiments, absorbing the transient condition using electrical system 30 may comprise one of: injecting power into aircraft engine 10 by transferring power from electrical system 30 to HP spool 20; and drawing power from aircraft engine 10 by transferring power from HP spool 20 to electrical system 30. For example, injecting power into aircraft engine 10 may comprise transferring power from APU 34 to HP spool 20. For example, such transfer of power may be made via electric machine 44, power unit 42, electric machine 32 and AGB 28 (see FIG. 2). In some embodiments, injecting power into aircraft engine 10 may comprises: converting mechanical power from a source of mechanical power (e.g., APU 34) separate from aircraft engine 10 into electrical power; and using the electrical power to drive electric machine 32 as a motor coupled to HP spool 20 of aircraft engine 10. Alternatively or in addition, injecting power into aircraft engine 10 may comprise transferring power from battery 36 to HP spool 20 via power unit 42, electric machine 32 and AGB 28.

Drawing power from engine 10 may comprise connecting one or more electrical loads to electric machine 32 coupled to HP spool 20 and operating electric machine 32 as a generator. For example, power unit 42 may connect battery 36 to electric machine 32 so that power drawn from HP spool 20 may be used to recharge battery 36. Alternatively or in addition, power unit 42 may disconnect one or more loads associated with aircraft services 38 from electric machine 44 or from battery 36 and reconnect the same one or more loads to electric machine 32 instead so that the drawn power may be used to power such loads instead of being powered by APU 34 or battery 36. In some operating conditions, one or more accessories 40 could be similarly connected to electric machine 32 via power unit 42 to consume power drawn from HP spool 20.

The injection of power into engine 10 and/or the drawing of power from engine 10 via power unit 42 may be controlled (e.g., commanded) by EEC 48 based on instructions (e.g., signals) transferred between power unit 42 and EEC 48. Under the control of EEC 48, power unit 42 may be configured and operated to control an amount of power that is transferred to and/or from engine 10 with respect to time. The amount of power being transferred may be based on the type and duration of the transient condition and also the level of urgency for the new operating condition of aircraft engine 10 to be reached. For example, the level of assistance to be provided by electric system 30 for different transient conditions may be predetermined and stored as a look-up table available to EEC 48 so that EEC 48 may instruct power unit 42 accordingly. Various control algorithms including feedback control algorithms may be used by power unit 42 and/or EEC 48 to control the amount of power transferred to/from aircraft engine 10 during such transient condition. For example, one or more of proportional (P), derivative (D)

and integral (I)—type control(s) may be used depending on the specific application and requirements.

Figure 4:
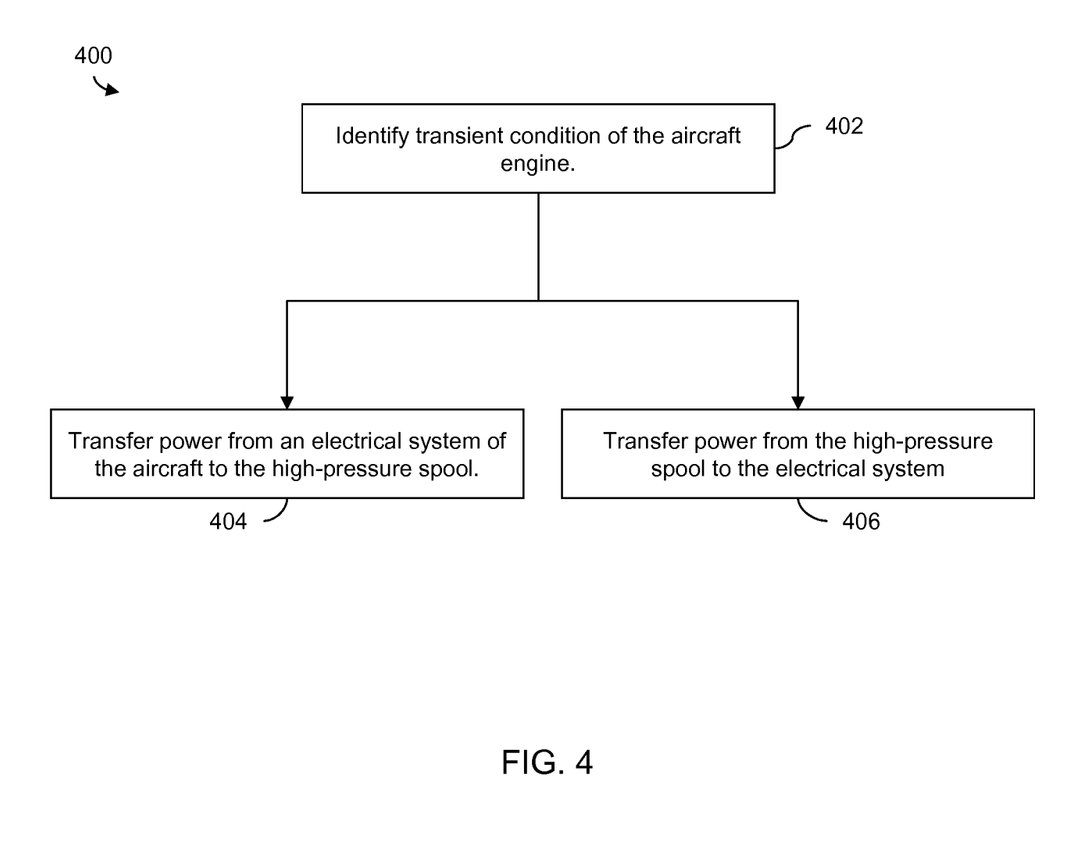
FIG. 4 is a flowchart illustrating another exemplary method for operating an aircraft engine during a transient condition.

FIG. 4 is a flowchart illustrating another exemplary method 400 for operating an aircraft engine during a transient condition. As described above, aircraft engine 10 may be comprising a gas turbine having HP spool 20 and LP spool 24 and the transient condition may, in some embodiments, be identified during operation of engine 10 and accordingly may comprise a transient condition other than the starting of engine 10. Method 400 may be conducted in combination with method 300. Also, some elements of method 400 may be common to method 300 and therefore description of such elements presented above also applies to method 400 will not be repeated.

In various embodiments, method 400 may comprise: identifying the transient condition of aircraft engine 10 during operation of aircraft engine 10 (see block 402); conditioned upon the transient condition requiring an increase in rotational speed of HP spool 20, injecting power into aircraft engine 10 by transferring power from electrical system 30 of the aircraft to HP spool 20 to at least assist in achieving the required increase in rotational speed of HP spool 20 during the transient condition (see block 404); and conditioned upon the transient condition requiring a decrease in rotational speed of the HP spool 20, drawing power from aircraft engine 10 by transferring power from HP spool 20 to electrical system 30 to at least assist in achieving the required decrease in rotational speed of HP spool 20 during the transient condition (see block 406).

As described above, injecting power into aircraft engine 10 may comprise transferring power from APU 34 to HP spool 20. For example, injecting power into aircraft engine 30 may comprise: converting mechanical power from a source of mechanical power (e.g., APU 34) separate from aircraft engine 10 into electrical power; and using the electrical power to drive electric machine 32 as an electric motor coupled to HP spool 20. Such source of mechanical power may comprise a combustion engine.

During normal (e.g., non-transient) operation of aircraft engine, electric machine 32 may in some embodiments be used as a generator for powering various loads of electrical system 30. Accordingly, if power is to be transferred to aircraft engine 10 during a transient condition, it might be necessary to disconnect one or more electrical loads from electric machine 32 prior to operating electric machine 32 as an electric motor.

As described above, drawing power from aircraft engine 10 may comprise connecting (e.g., adding) an electrical load to electric machine 32 coupled to HP spool 20 and operating electric machine 32 as a generator.

Method 300 and/or method 400 or part(s) thereof may be conducted under the control of EEC 48 based on machine-readable instructions accessible to or stored within EEC 48. Accordingly, based on the detection of the transient condition, EEC 48 may command the injection of power into aircraft engine 10 from electrical system 30 or the drawing of power from aircraft engine 10 to electrical system 30 accordingly. The identification of the transient condition may comprise detecting an actuation of a user input device (e.g., throttle lever) associated with aircraft engine 10. As described above EEC 48 may be configured to control an amount of power injected into or drawn from aircraft engine 10 based on the transient condition identified.

In various embodiments, the injection or drawing of power to/from HP spool 20 with a source/load external to engine 10 may improve the transient response of engine 10 by permitting engine 10 reach its new operating condition quicker. In some embodiments, the injection of power to HP spool 20 may improve the surge margin of engine 10. For example, in some configurations of engine 10, it is estimated that around idle speed, injected power corresponding to about 1.5% of the main engine rated power could represent up to 5% improvement in low power surge margin. Therefore, in some cases a relatively small electrical system 30 could provide a significant advantage in sizing and matching the engine(s) 10, especially in situations where more than one engine 10 is mounted to an aircraft. Various aspects of the present disclosure could also be used on aircraft having a single engine.

During deceleration, the flameout margin could be improved in some situations by drawing power from HP spool 20 to slow down the rotary speed of HP spool 20 and use the drawn power to charge battery 36 or supply one or more systems (e.g., aircraft services 38) of the airplane.

Various aspects of the present disclosure are also applicable to rotorcraft where engines of rotorcraft could benefit from transient power management as described herein during transient conditions such as one engine inoperative (OEI), autorotation decoupling and rotor governing during fast collective pitch (CLP) maneuvers. Other power transfer arrangements to improve efficiency could also be implemented by transferring heat to a liquid cooling system for heating of the aircraft cabin or de-icing functions.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. While the methods, systems and engines disclosed and shown herein may comprise a specific number of elements/components, the methods, systems and engines could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples disclosed, but should be given the broadest interpretation consistent with the description as a whole.

What is claimed is:

1. A method for operating an aircraft engine during a transient condition of the aircraft engine, the aircraft engine including a turbine having at least a high-pressure turbine spool and a low-pressure turbine spool, the method comprising:

identifying a transient condition of the aircraft engine during operation of the aircraft engine requiring one of an increase or decrease in rotational speed of the high-pressure spool, the identification of the transient condition comprising detecting an actuation of a throttle lever associated with the aircraft engine;

conditioned upon the transient condition requiring an increase in rotational speed of the high-pressure spool, providing power from a source of power separate from the aircraft engine to the high-pressure spool to at least partially accelerate the high-pressure spool during the transient condition, the source of power being part of an electrical system of an aircraft; and conditioned upon the transient condition requiring a decrease in rotational speed of the high-pressure spool, drawing power from the high-pressure spool to the electrical system to at least partially decelerate the high-pressure spool during the transient condition.

2. The method as defined in claim 1, wherein the step of providing power comprises transferring power from an auxiliary power unit to the high-pressure spool.

3. The method as defined in claim 1, wherein the step of providing power comprises:

converting mechanical power from a source of mechanical power separate from the aircraft engine into electrical power; and using the electrical power to drive an electric motor coupled to the high-pressure spool.

4. The method as defined in claim 3, wherein the source of mechanical power comprises an auxiliary power unit.

5. The method as defined in claim 1, wherein drawing power from the aircraft engine comprises connecting an electrical load to an electric machine coupled to the high-pressure spool and operating the electric machine as a generator.

6. The method as defined in claim 1, wherein the source of power comprises a battery.

7. The method as defined in claim 1, comprising disconnecting an electrical load from an electric generator coupled to the high-pressure spool conditioned upon the transient condition comprising a required increase in rotational speed of the high-pressure spool.

8. The method as defined in claim 7, wherein the source of power comprises an auxiliary power unit.

9. An aircraft engine comprising:

a high-pressure spool;

a low-pressure spool configured for rotation separate from the high-pressure spool; and a controller configured to, during operation of the aircraft engine, identify a transient condition of the aircraft engine based on an actuation of a throttle lever associated with the aircraft engine and command:

conditioned upon the transient condition requiring an increase in rotational speed of the high-pressure spool, injection of power into the aircraft engine by transferring power from a source of power separate from the aircraft engine to the high-pressure spool to at least assist in achieving the required increase in rotational speed of the high-pressure spool during the transient condition, the source of power being part of an electrical system of an aircraft; and conditioned upon the transient condition requiring a decrease in rotational speed of the high-pressure spool, drawing of power from the aircraft engine by transferring power from the high-pressure spool to the electrical system to at least assist in achieving the required decrease in rotational speed of the high-pressure spool during the transient condition.

10. The aircraft engine as defined in claim 9, wherein the source of power comprises at least one of a battery and an auxiliary power unit.

11. The aircraft engine as defined in claim 9, wherein the controller is configured to control an amount of power injected into or drawn from the aircraft engine based on the transient condition.

12. A method for operating an aircraft engine during a transient condition of the aircraft engine, the aircraft engine comprising a gas turbine having a high-pressure spool and a low-pressure spool, the method comprising:

identifying a transient condition of the aircraft engine during operation of the aircraft engine, the identification of the transient condition comprising detecting an actuation of a throttle lever associated with the aircraft engine; and at least partially absorbing the transient condition of the aircraft engine using an electrical system of an aircraft by injecting power into the aircraft engine by transferring power from a source of power separate from the aircraft engine and part of the electrical system to the high-pressure spool.

13. The method as defined in claim 12, wherein injecting power into the aircraft engine comprises transferring power from an auxiliary power unit to the high-pressure spool.

14. The method as defined in claim 12, wherein injecting power into the aircraft engine comprises:

converting mechanical power from a source of mechanical power separate from the aircraft engine into electrical power; and using the electrical power to drive an electric motor coupled to the high-pressure spool of the aircraft engine.

15. The method as defined in claim 12, wherein drawing power from the aircraft engine comprises connecting an electrical load to an electric machine coupled to the high-pressure spool and operating the electric machine as a generator.

16. The method as defined in claim 12, comprising controlling an amount of power injected into or drawn from the aircraft engine based on the transient condition.

17. The method as defined in claim 12, wherein the transient condition comprises a condition other than starting the aircraft engine.

* * * * *